US008628198B2

(12) United States Patent
Jalbout et al.

(10) Patent No.: US 8,628,198 B2

(45) Date of Patent: Jan. 14, 2014

(54) LIGHTING TECHNIQUES FOR WIRELESSLY CONTROLLING LIGHTING ELEMENTS

(75) Inventors: Bassam D. Jalbout, Mont-Royal (CA); Brian Wong, Kirkland (CA)

(73) Assignee: LSI Industries, Inc., Cincinnati, OH (US)

(*) Notice: Subject to any disclaimer, the term of this patent is extended or adjusted under 35 U.S.C. 154(b) by 79 days.

(21) Appl. No.: 12/426,531

(22) Filed: Apr. 20, 2009

(65) Prior Publication Data

US 2010/0264313 A1 Oct. 21, 2010

(51) Int. Cl.

| | |
|---|---|
| ***G03B 21/00*** | (2006.01) |
| ***G03B 21/20*** | (2006.01) |
| ***G09G 3/14*** | (2006.01) |
| ***G09G 3/22*** | (2006.01) |
| ***G09G 3/32*** | (2006.01) |
| ***H04B 10/00*** | (2013.01) |
| ***H04N 5/44*** | (2011.01) |

(52) U.S. Cl.

USPC ................. 353/85; 353/122; 345/46; 345/82; 345/183; 348/734; 398/106; 398/130; 362/800

(58) Field of Classification Search

USPC .............. 353/122, 85, 69–70; 345/39, 82–83, 345/183, 46; 362/800; 315/312, 317–319; 348/734; 398/106, 112, 118, 130

See application file for complete search history.

(56) References Cited

U.S. PATENT DOCUMENTS

| | | | |
|---|---|---|---|
| 4,170,077 | A | 10/1979 | Pardes |
| 4,375,106 | A | 2/1983 | Voll |
| 4,443,058 | A | 4/1984 | Bosserman |
| 4,530,010 | A | 7/1985 | Billingsley |
| 4,707,595 | A | 11/1987 | Meyers |
| 4,977,323 | A | 12/1990 | Jehle |
| 4,982,092 | A | 1/1991 | Jehle |
| RE33,572 | E | 4/1991 | Meyers |
| 5,012,112 | A | 4/1991 | Flint |
| 5,060,309 | A | 10/1991 | Narita |
| 5,159,378 | A | 10/1992 | Takada |
| 5,196,926 | A | 3/1993 | Lee |
| 5,282,121 | A | 1/1994 | Bornhorst |
| 5,497,207 | A | 3/1996 | Kim |

(Continued)

FOREIGN PATENT DOCUMENTS

| | | |
|---|---|---|
| CN | 101164382 | 4/2008 |
| JP | 200970832 | 4/2009 |

OTHER PUBLICATIONS

Office Action dated Apr. 18, 2013 from Corresponding Japanese Patent Application No. 2012-506093.

(Continued)

*Primary Examiner* — Tony Ko
*Assistant Examiner* — Jori S Reilly-Diakun
(74) *Attorney, Agent, or Firm* — McDermott Will & Emery LLP

(57) ABSTRACT

Lighting systems, apparatus, and methods are disclosed, which employ optical transmission of two-dimensional control signals to manipulate lighting elements. The lighting apparatus can include a projector with an IR LED array to wirelessly transmit pixel information onto a target space. The pixel information controls lighting elements within the target space. The two-dimensional control signals can includes sub-areas corresponding to lighting elements in a control array. The lighting elements can be lights producing light of desired wavelengths including infrared and/or visible wavelengths. LEDs can be used as light sources in exemplary embodiments.

14 Claims, 9 Drawing Sheets

(56) References Cited

U.S. PATENT DOCUMENTS

| | | | | |
|---|---|---|---|---|
| 5,523,579 | A | 6/1996 | Orlando | |
| 5,584,552 | A | 12/1996 | Nam-Su | |
| 5,606,344 | A | 2/1997 | Blaskey | |
| 5,696,564 | A | 12/1997 | Hatakeyama | |
| 5,758,956 | A | 6/1998 | Bornhorst | |
| 5,829,868 | A | 11/1998 | Hutton | |
| 5,949,081 | A | 9/1999 | Ashley | |
| 6,011,640 | A | 1/2000 | Hutton | |
| 6,188,507 | B1 | 2/2001 | Thomas | |
| 6,361,173 | B1 | 3/2002 | Vlahos | |
| 6,525,814 | B1 | 2/2003 | Hendrick, Jr. | |
| 6,548,967 | B1 | 4/2003 | Dowling et al. | |
| 6,623,144 | B2 | 9/2003 | Bornhorst | |
| 6,635,892 | B2 | 10/2003 | Kelly, Jr. | |
| 6,680,579 | B2 * | 1/2004 | Allen et al. | 315/169.3 |
| 6,703,631 | B2 | 3/2004 | Suzuki | |
| 6,742,901 | B2 | 6/2004 | Kimura | |
| 6,769,792 | B1 | 8/2004 | Bornhorst | |
| 6,773,119 | B2 | 8/2004 | Kimura | |
| 6,793,349 | B2 | 9/2004 | Hooper | |
| 6,793,353 | B2 | 9/2004 | Kimura | |
| 6,799,853 | B2 | 10/2004 | Silverbrook | |
| 6,827,454 | B2 | 12/2004 | Kimura | |
| 7,057,583 | B2 * | 6/2006 | Koll et al. | 345/30 |
| 7,064,498 | B2 | 6/2006 | Dowling | |
| 7,084,405 | B1 | 8/2006 | Malyutenko | |
| 7,129,910 | B2 * | 10/2006 | Da Cunha et al. | 345/1.2 |
| 7,710,271 | B2 * | 5/2010 | Frumau | 340/572.1 |
| 8,093,817 | B2 * | 1/2012 | Frumau et al. | 315/151 |
| 2003/0025458 | A1 * | 2/2003 | Tuli | 315/169.3 |
| 2003/0057887 | A1 | 3/2003 | Dowling et al. | |
| 2004/0160199 | A1 * | 8/2004 | Morgan et al. | 315/312 |
| 2004/0187184 | A1 * | 9/2004 | Rubin et al. | 2/69 |
| 2007/0160373 | A1 | 7/2007 | Biegelsen et al. | |
| 2008/0246927 | A1 | 10/2008 | Inoue et al. | |
| 2009/0046252 | A1 * | 2/2009 | Heym et al. | 353/13 |
| 2009/0150158 | A1 * | 6/2009 | Becker et al. | 704/270 |
| 2010/0115683 | A1 * | 5/2010 | Krans et al. | 2/115 |

OTHER PUBLICATIONS

The International Search Report and the Written Opinion from corresponding PCT Application No. PCT/US2010/030713, mailed: Jul. 23, 2010.

English Version of Office Action dated Jul. 23, 2013 from Corresponding Chinese Patent Application No. 201080017340.5.

* cited by examiner

LIGHTING TECHNIQUES FOR WIRELESSLY CONTROLLING LIGHTING ELEMENTS

FIELD OF THE DISCLOSURE

The present disclosure relates to lighting control apparatus and related methods. More specifically, lighting control apparatus can use and transmit wireless control signals to manipulate and control remote lighting elements.

BACKGROUND OF THE DISCLOSURE

Control of lighting elements, such as light bulbs and light emitting diodes (LEDs) has always been an important factor in lighting design. Quick and efficient manipulation of lighting elements is desirable in any lighting implementation. Current methods of controlling lighting elements include hardwiring controls to individual lighting elements.

Another design concern with nearly all lighting apparatus is controlling lighting behavior. When lighting elements serve various functions, such as emitting colorful lights, intermittent timing sequences, or otherwise, a designer can develop a scheme for controlling these optical characteristics. Again, current methods include hardwiring controls to each lighting element for managing optical characteristics.

One design concern with most lighting apparatuses is power consumption and control. Designers are increasingly turning to alternative designs to control power usage of lighting elements, which ultimately aids consumers in lowering operating costs. For example, one design alternative is to implement an automatic light switch which turns off after periods of inactivity triggered a motion sensor. Similarly, remotely controlling lighting elements is another way of turning lighting elements on and off.

Another concern a designer may face is mobility of lighting elements within a space. In certain applications, lighting elements are not stationary and the system requires controlling optical characteristics of lighting elements which are mobile. If a lighting system is used to light different areas in a space, optimal system operation can require that lighting elements within the system be mobile while maintaining control of their optical characteristics. For example, in stage lighting, light distribution is manipulated routinely such that lighting elements must be moved while maintaining control of their optical characteristics.

Given these considerations, efficient wireless control of lighting elements and their optical characteristics is desirable. Systems and methods that aid in reducing power consumption through controlling lighting elements are desirable. High-speed, efficient wireless control of lighting elements is an attractive feature in certain lighting implementations that require remote control of the optical behavior of lighting elements. Moreover, wireless control of mobile lighting elements is also a desirable feature of lighting apparatus and methods to permit users to easily manipulate light distribution in spaces to be illuminated.

SUMMARY

The present disclosure pertains to lighting apparatus providing wireless control of lighting elements. More specifically, the present disclosure describes projector systems for transmitting and a module for receiving optical control signals to manipulate lighting elements on the module. The projector can transmit a two-dimensional control signal onto a target space to control lighting elements within that target space.

In one embodiment, the projector system can time multiplex transmission of a control image to serially transmit a two-dimensional control image onto and through one or more target spaces. The projector system can include an array of infrared (IR) light emitting diodes (LEDs) to optically transmit a two-dimensional control image. The projector system can also include one or more simple lenses to magnify and direct a control image.

In an embodiment, a module for receiving optical control signals can receive infrared signals. In alternate embodiments, lighting elements controlled by a module for receiving optical control signals can include LEDs.

It should be understood that while certain embodiments/aspects are described herein, other embodiments/aspects according to the present disclosure will become readily apparent to those skilled in the art from the following detailed description, wherein exemplary embodiments are shown and described by way of illustration. The techniques are capable of other and different embodiments, and details of such are capable of modification in various other respects. Accordingly, the drawings and detailed description are to be regarded as illustrative in nature and not as restrictive.

BRIEF DESCRIPTION OF THE DRAWINGS

Aspects and embodiments of the present disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 2:
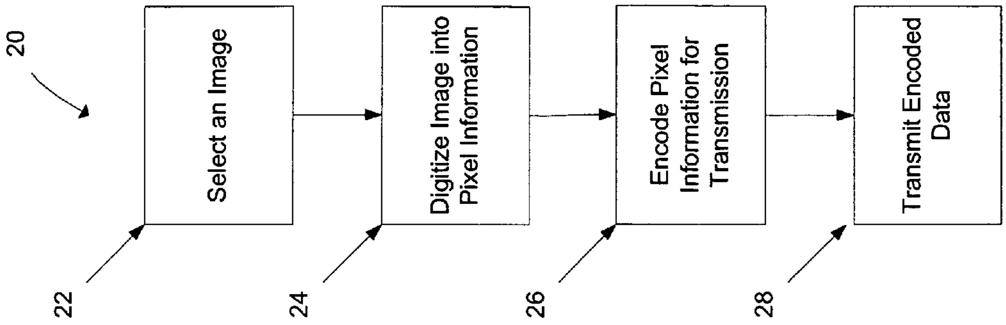
FIG. 2 shows a flow chart demonstrating one method of converting an image to a control signal image.

While certain embodiments depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

The present disclosure is generally directed to methods and apparatus for wireless control of lighting elements. More specifically, lighting apparatus and methods are disclosed which employ a projector to wirelessly transmit control signals as one or more projected images over or through a space encompassing reactive modules (receivers) that include lighting elements. By sending control signals wirelessly by such techniques, lighting elements can be manipulated remotely, quickly, and efficiently. Further, the lighting elements can be controlled based on their location, not based on their identity. The disclosed techniques can include a projector to wirelessly transmit control signals and one or more reactive modules to receive those commands.

Generally, one embodiment of this disclosure contemplates wireless control of any lighting element using a two-dimensional projected image of control signals. As further described below, a pixel-like section of the projected image can represent a different control signal transmitted to or over a target space encompassing one or more reactive modules. In exemplary embodiments, a projector is used to project a two-dimensional control image on or through a three-dimensional space or volume for reception by reactive modules. The projector can include multiple light sources or elements that are configured in an array of desired shape to optically transmit a two-dimensional control image. Because the projector can utilize multiple light sources, the projected control image can includes sub-images, where each sub-image corresponds to a light source. Through control (e.g., modulation) of the individual light sources/elements in the array, the sub-images act like pixels of the projected control image.

As described in further detail below, the projected image can be used to effectively transmit control signals to reactive modules (which include lighting elements) that are within the space or volume over which the control image is projected, e.g., area of a concert audience, auditorium, etc. Thus, reactive modules encompassed within a target space upon which a sub-image is projected are controlled by the received control signals included in the sub-image. In such embodiments, lighting elements are controlled not by their individual modules, but rather by their location relative to the projected control image and its included images of each light source/element ("pixels") within the projector. For example, at a concert, lighting elements on reactive modules worn by individual audience members can be controlled such that the audience as a whole can be used to display an image or pattern.

Figure 1:
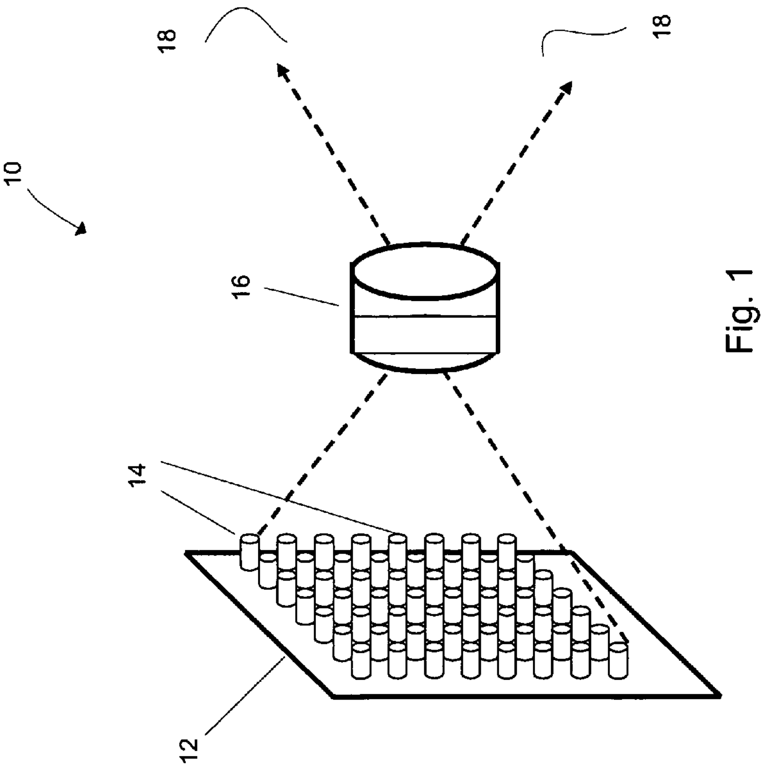
FIG. 1 shows an embodiment of a wireless signal projector.

Referring now to FIG. 1, an embodiment of a projector 10 for use in practicing the disclosed lighting apparatus is represented. The projector 10 includes a circuit board 12, an array of infrared (IR) LEDs 14, and a lens system 16 to project a control signal image 18. The projector 10 provides an optical control image to be projected onto a target space/area. This optical control image is represented by each of the individual IR LEDs as arranged in the array. One or more IR LEDs can act like a "pixel" within the control image and can transmit a control signal to control a receiver. In one embodiment, the control signal of each pixel is pulse encoded, e.g. by suitable pulse width modulation techniques, as discussed below in further detail. As the projector may be required to cover a different size area for different applications, e.g., at different concerts, a selection of projector lenses of varying focal length may be used; a zoom optic can also be used. In some embodiments, an IR-sensitive video camera (or other IR viewing device) can be used to monitor/view the area illuminated by the projector. Various embodiments of the present disclosure can utilize IR wavelengths between roughly about 750 nm and 1 micron, though other wavelengths may be used within the scope of the present disclosure, including for example medium and long-wave infrared and/or visible light. Exemplary embodiments of the present disclosure can use IR LEDs operational with a peak output wavelength of about 850 nm or about 940 nm.

In an embodiment using IR LEDs for wireless transmission, each IR LED in the array 14 is driven by individual driver circuitry, such that each IR LED 14 can emit a signal independent and unique from the other IR LEDs in the array 14. Contemplated embodiments permit simultaneous transmission of different control signals at each IR LED, or "pixel". Alternatively, each IR LED in the array 14 can serially transmit control signals, such that a control signal is driven through an IR LED in its own time slot, i.e., in a time-multiplexed manner. For example, in a time-multiplexed embodiment, the control image can be streamed through the IR LED array 14 one pixel at a time, in predetermined time slots. One benefit of this embodiment is to reduce the transmitted signal to noise ratio: if all IR LEDs were transmitting at the same time, the overall optical glare would decrease the signal to noise ratio very considerably. In a time-multiplexed example, in the case of 40×50 "pixels," 2000 time slots would be required. If the image were to be refreshed at a rate of 10 Hz, then each time slot would have a length of $\frac{1}{2000}$×100 ms=50 μs. Further, in this example, if each pixel control signal is a bit-encoded pulsed data stream and the pulsed data stream is encoded in 10 bit ASCII format, then the bit rate would have to be slightly higher than 5 μs. A 1 μs pulse rate would thus allow for five times oversampling for each frame in this example.

In an embodiment using IR as a mode of wireless transmission, the control image is created by one or more LED driver circuits and one or more IR LEDs. In one non-limiting example, these IR LEDs may be Sharp infrared emitting diodes or LG Electronics. The IR LEDs 14 may be directly mounted onto a printed circuit board (PCB) 12.

The produced control image is transmitted through lens system 16. In conjunction with or alternative to such a lens system 16 or combination of lenses, other suitable optical elements such as mirrors may be used for projection of the control image. The lens system 16 may include one or more lenses to efficiently direct, project, and/or magnify the control image onto a space encompassing the reactive modules. In an exemplary embodiment, the lens system 16 can include standard commercially available lenses, e.g., as supplied by Pentax or Minolta, configured to magnify the image of the light source (e.g., LED) array. The projected image can also be collimated as desired. Since the projector may be required to cover different areas, various lenses can be applied to vary focal length, magnification, or other adjustment. In this manner, the control image can be projected onto or through a target space. The projector lens system can, for exemplary embodiments, be any simple lens with a positive (+) diopter value. The lens system can be a simple magnifying glass (one uncoated lens of double convex or plano-convex configuration). Use of a lens that produces a blur effect on the control image, which effect can serve to fill in areas between pixels of the projected image.

Referring now to FIG. 2, flow chart 20 represents one method of generating an image to be sent to be displayed on a target space. First, the operator of the lighting apparatus selects an image 22 for projection onto the space. For example, this image 22 can be a snapshot of a video, such as from a television, video camera, DVD player, or Blu-Ray player. The image could also be a photo or any pattern. Thus, any frame, pattern, photo, other image, or sequences thereof (e.g. video) can be "projected" on to a space by playing it through the reactive modules, which are described below in further detail.

Next, the image 22 is digitized 24 into pixel information. This digitization can be accomplished using a PC video card to produce a digital image of predetermined or desired resolution. This pixel information describes the features and characteristics of the corresponding pixel of the image 22, such as color, brightness, intensity, or otherwise. The pixel information is then encoded 26 into a control signal image for projection. A CPU can perform such encoding. In one embodiment, the encoding process may be achieved by transmitting the bit information as a stream of pulses. In an example of a 40×50 pixel image, 2000 data elements would be created and each element could be encoded as 8-bit ASCII characters.

The control signals, each of which correspond to pixels in the original image 22, collectively constitute the control image to be projected onto or through a target space. In exemplary embodiments, the image 22 can be digitized to have a pixel resolution that matches (or nearly matches) the number of lighting elements in the projector array, e.g., the array of infrared (IR) LEDs 14 depicted in FIG. 1.

Each control signal can then be transmitted 28 to its corresponding IR LED in the IR LED array 14. As shown in the flow chart 20, this transmission can occur through clocking 28 each control signal to the appropriate driver circuitry for each IR LED in the array 14.

Figure 3:
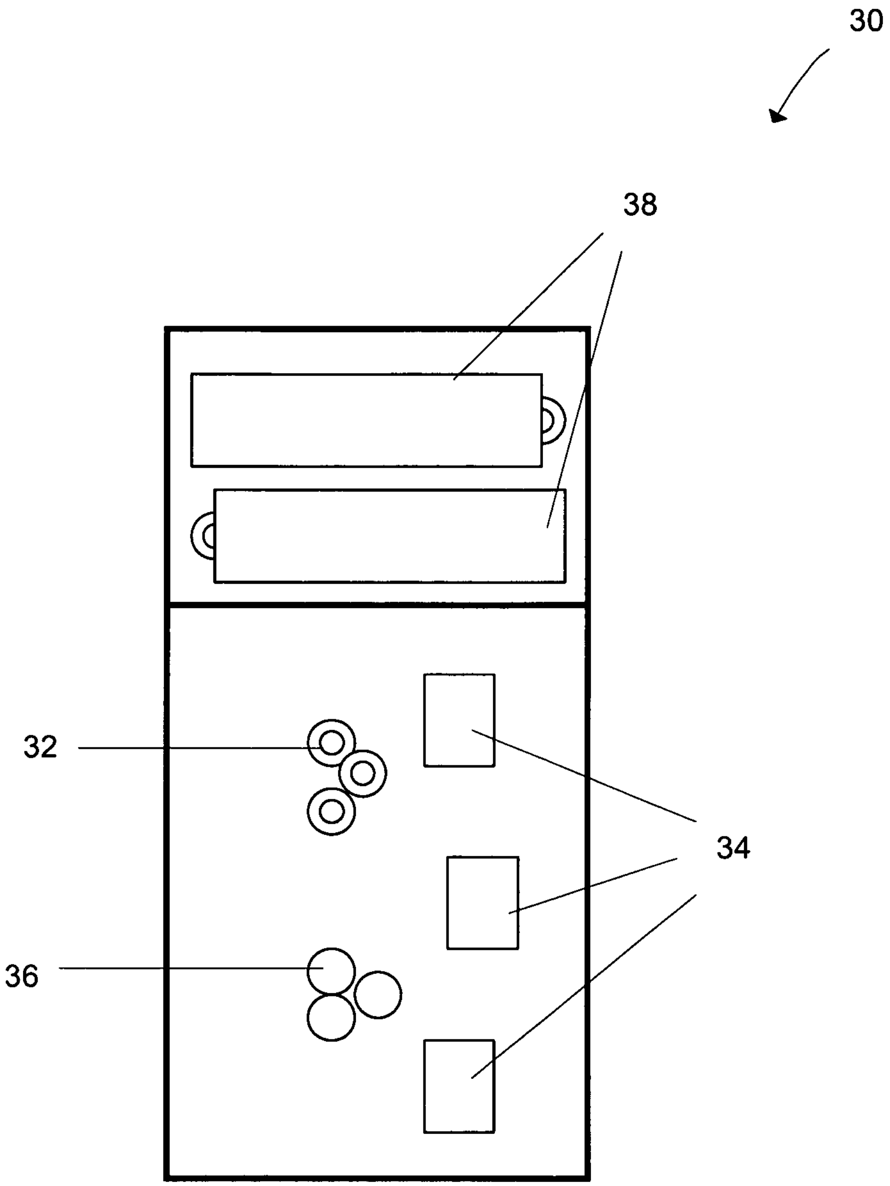
FIG. 3 shows an embodiment of a reactive module.

FIG. 3 shows one exemplary reactive module 30. This reactive module 30 is comprised of detectors 32, computing units 34, lighting elements 36, and a power source 38. In one embodiment, a projected image 18 is wirelessly transmitted onto a target space encompassing reactive modules 30, where each "pixel" of the projected image 18 defines an area within the space to display the corresponding pixel of the original image 22. Thus, the projected image dictates a reactive module's 30 behavior. The reactive module 30 receives the control signal transmitted to its area within the target space and subsequently reacts to the command by varying brightness, color, intensity, timing, or other feature or characteristic. If the projected image is transmitted via IR, then the reactive module's 30 detector 32 can be an IR optical detector 40. An IR optical detector can be constructed by placing an IR filter onto an optical transistor. For mobility, the power source can be battery powered 38.

Figure 4:
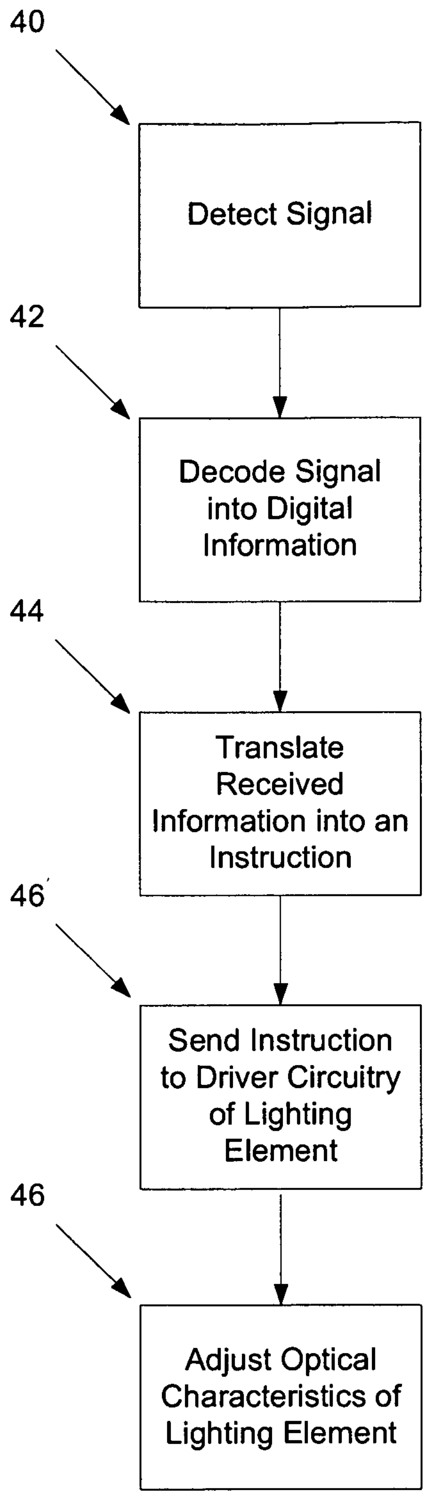
FIG. 4 represents a flow chart of one method of controlling lighting elements on a reactive module.

This reaction is shown in FIG. 4. The detectors 32 on the reactive module 30 detect the control signal, which represents a "pixel" of the projected image 18 and the corresponding original image 22. An IR detector 40 can be coupled to computing units 34 to interpret the received signal. If the wireless signal is bit-encoded as pulsed data, a pulse detector circuit 34, 42 is coupled to the signal detector 32, 40 to detect the rising and/or falling edges of the analog signal. A clock signal may be used to correctly time the detection of these edges. A decoder in the computing unit 34 next receives this digital information and converts 44 that it into an instruction for the lighting element 36. If, for example, the lighting element 36 is one or more LEDs (and their corresponding driver circuitry), then the command is delivered to the LED driver circuitry 46 for the LEDs 48. In this example, the LED driver circuitry drives the LEDs 48 in accordance with the instruction, the projected image 18, and ultimately the original video image 22.

A reactive module 30 can have multiple detectors 32 to maximize the received signal. With multiple detectors, the signals can be added to provide maximum signal to noise ratio. Also, placing detectors 32 at different angles can aid in receiving the signal in case other detectors 32 do not receive the wireless signal.

Figure 5:
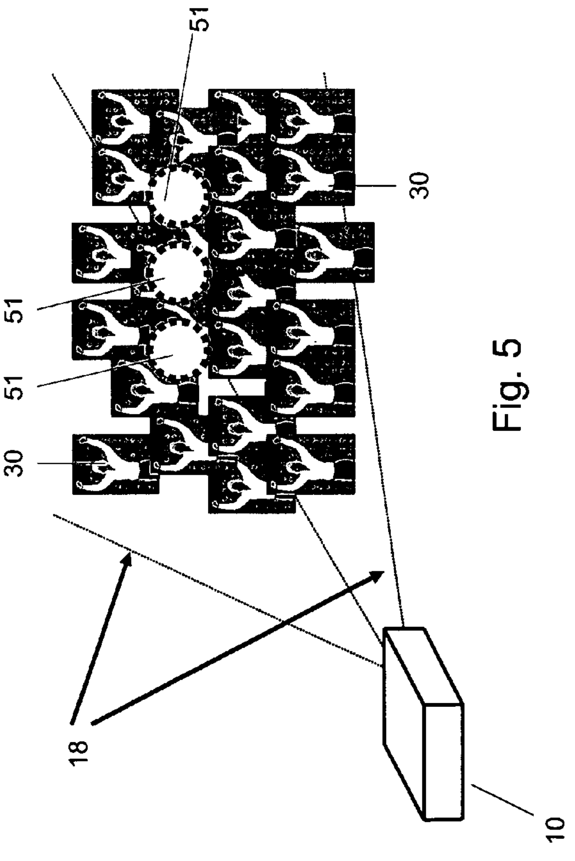
FIG. 5 depicts an embodiment of a lighting apparatus, in accordance with an exemplary embodiment of the present disclosure.
Figure 6:
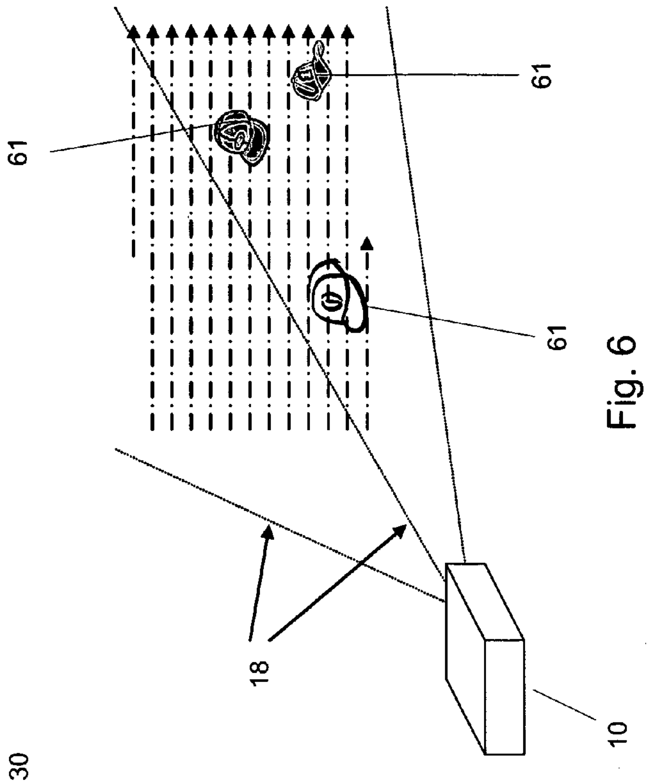
FIG. 6 depicts an alternate view of the embodiment of FIG. 5.

FIGS. 5 and 6 disclose an embodiment of the lighting apparatus implemented at a concert or event venue. The embodiment includes a projector 10 projecting an optical image 18 onto an audience possessing reactive modules 30. Each IR LED of the IR LED array 14 transmits pixel information through a control signal onto the corresponding area of the audience 51 and the reactive modules 30 therein. In an embodiment, the reactive modules can appear on various articles worn by audience members, such as hats 61.

Figure 7:
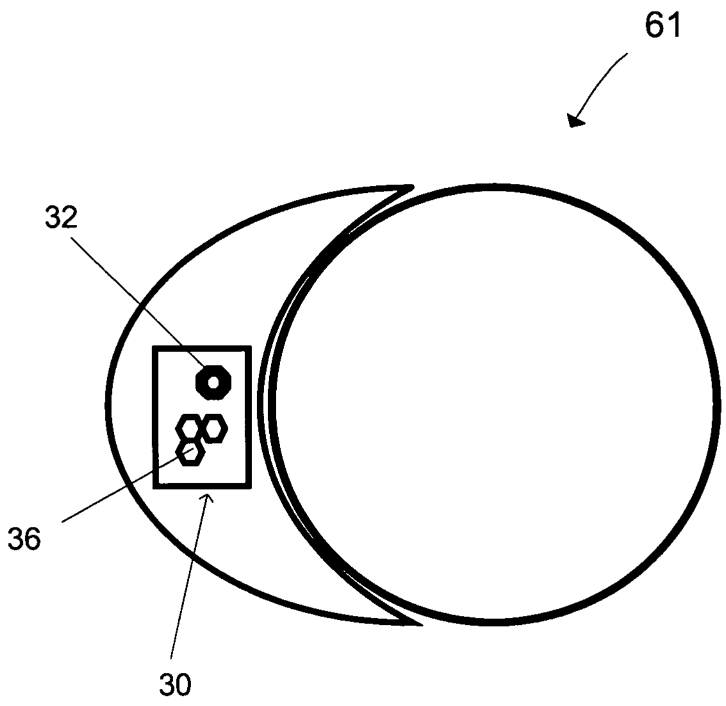
FIGS. 7 through 14 demonstrate different applications of reactive lighting modules, in accordance with the present disclosure.
Figure 8:
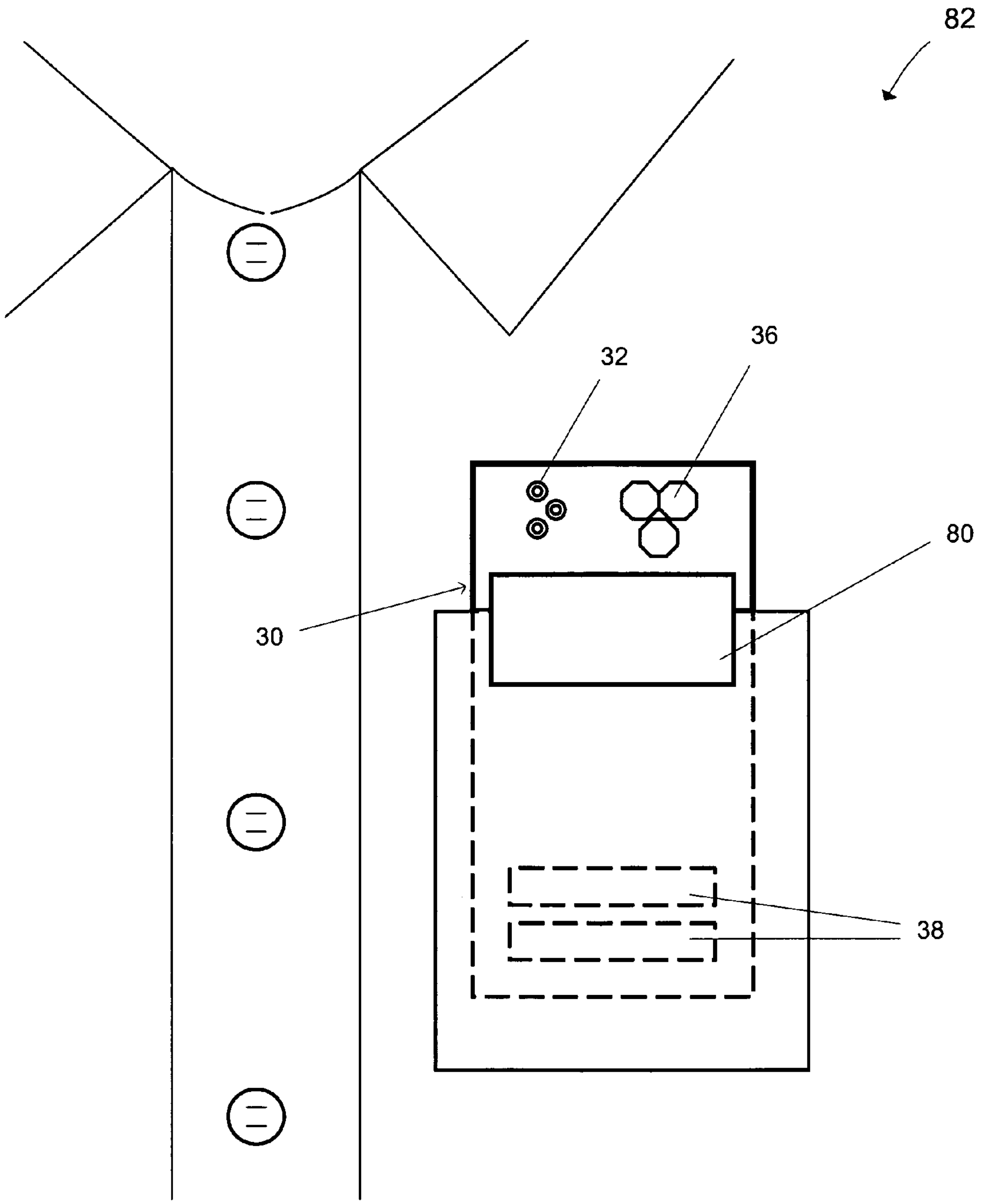
Figure 9:
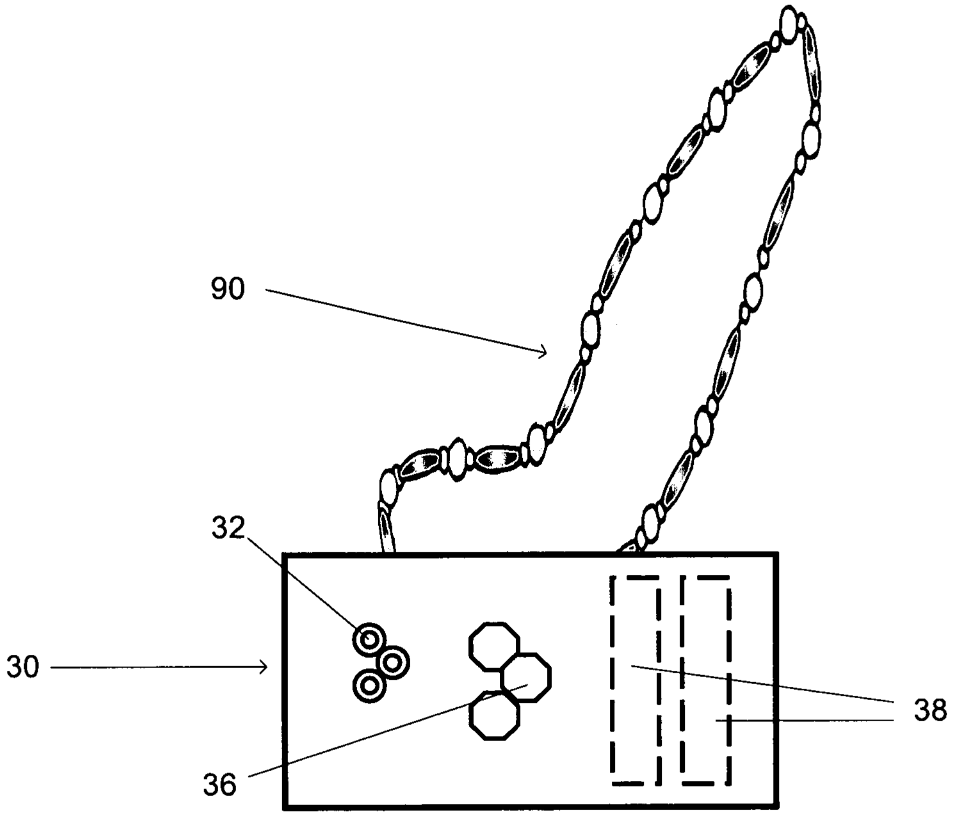
Figure 10:
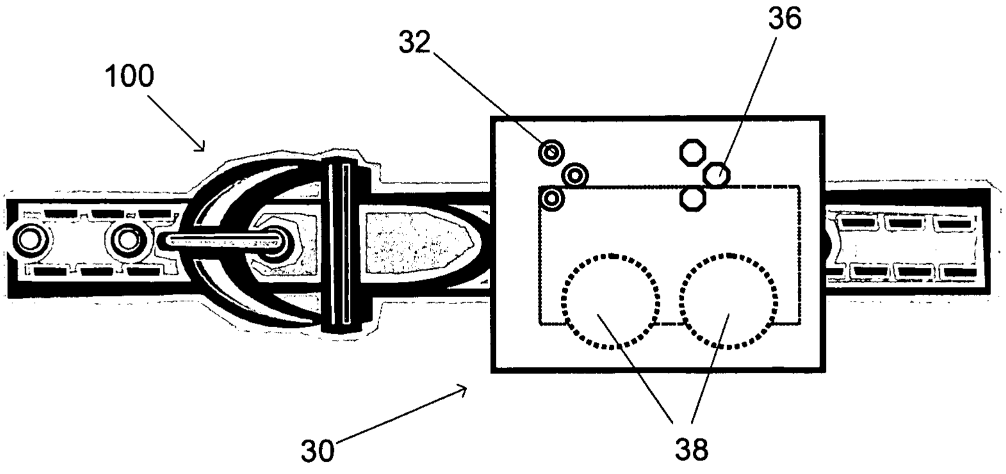
Figure 12:
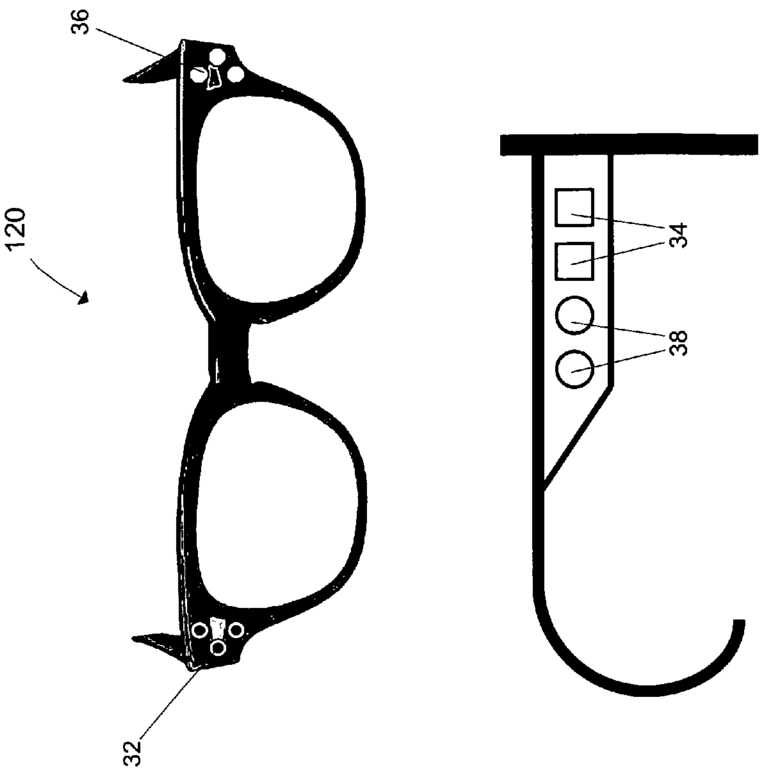
Figure 11:
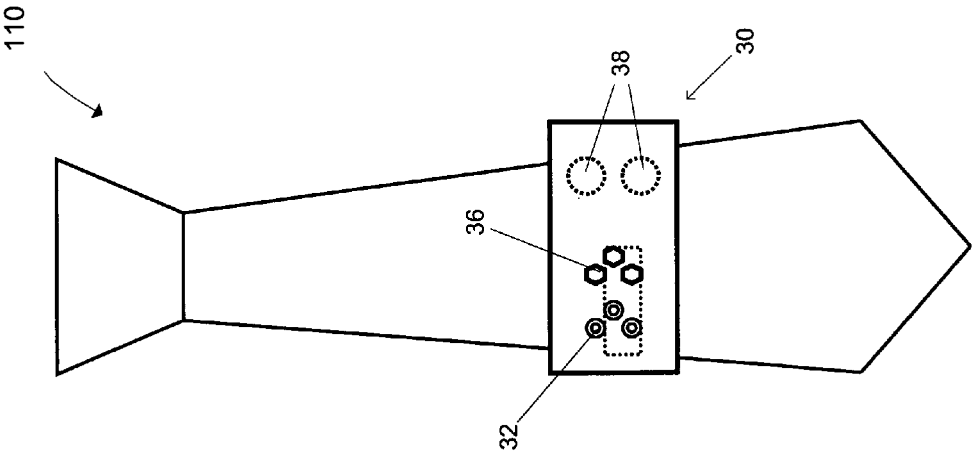
Figure 14:
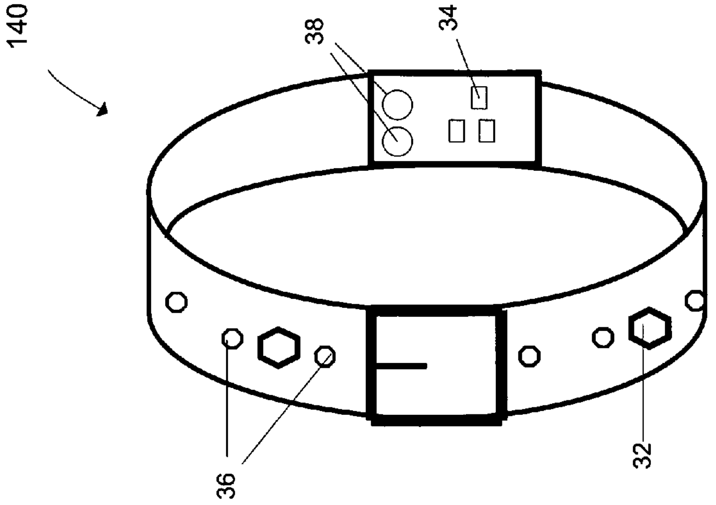
Figure 13:
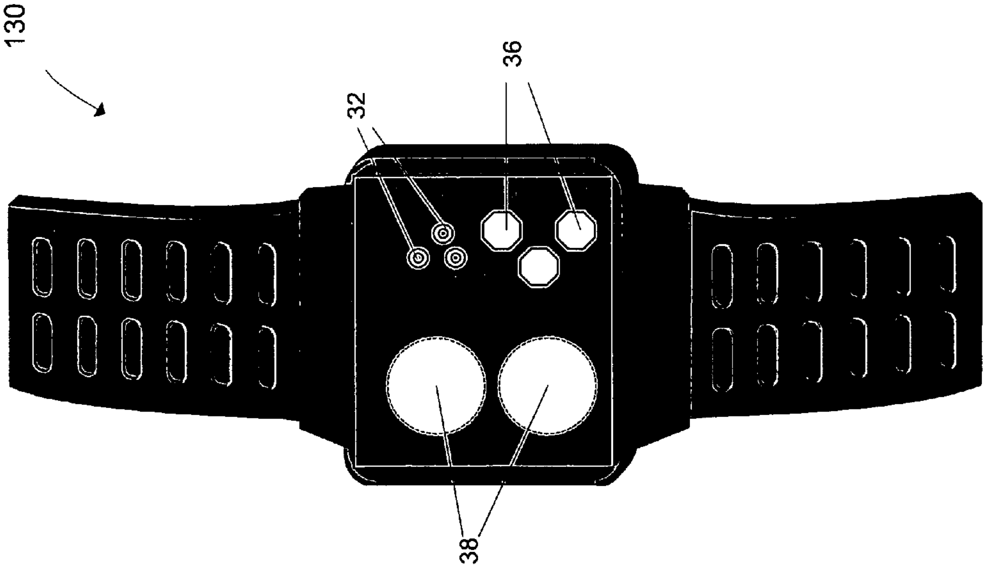

Other examples of these articles of clothing or accessories appear in FIGS. 7-14. The reactive module can be affixed to a hat 61 (e.g., as shown in FIG. 7), a pocket clip 80 for a shirt 82 (e.g., as shown in FIG. 8), and/or necklace 90 (e.g., as shown in FIG. 9), among other things. Reactive modules can be designed for affixation to smaller sized objects, such as a belt 100 (e.g., as shown in FIG. 10), and/or a tie clip 110 (e.g., as shown in FIG. 11). For small applications, the reactive modules can be designed to with surface mount components. These applications can include glasses 120 (e.g., as shown in FIG. 12), wrist bands and/or watches 130 (e.g., as shown in FIG. 13), and/or bracelets/anklets or necklaces/collars 140 (e.g., as shown in FIG. 14). Using different packaging techniques, virtually any imaginable article can incorporate a reactive module for use in this disclosed apparatus.

The reactive modules 30 can have lighting elements such as LEDs, of any color. In one embodiment, multiple LEDS of different colors, e.g. red, blue, and green, are used in a single reactive module to provide a complete color palette can be reproduced. In exemplary embodiments, contemplated LEDs can include LEDs made commercially available by Osram or Nichia, but other lighting elements are contemplated. These LEDs can be used to produce visible light for the control image and/or desired lighting effects from the reactive modules.

Each reactive module can receive a control signal projected to over or to its location. Accordingly, the same reactive device 22 in a different location would receive a different signal from the projector. The same reactive module may react differently if it moves between pixels. Thus reactive modules 30 in different areas of a target space display different outputs, and the overall target space can be coordinated to display any pattern or image desired.

If the LEDs are in very close proximity in the projector, the image projected onto the target space has only very small or negligible gaps between pixels. The reflections or scattering from the surroundings will fill these gaps. Any reactive module located directly in a seam between two pixels would pick up one signal or the other, and it makes no difference which, as he is located at the cusp of the two pixels and can correctly display either. In an exemplary embodiment, noise received from scattering of control signals can be sufficiently eliminated by filtering the received oversampled data stream, e.g., by filtering so as to remove noise using error-correction algorithms To maximize reception of the wireless image, the floor and other surroundings can be painted or coated to reflect the medium of wireless transmission. For example, if IR is the mode of transmission, the floors can be painted with IR reflective paint, which can be formulated into nearly any visible paint.

In an embodiment employing the disclosed methods and apparatus, audience members of an event or concert can wear one or more reactive modules that each include one or more lighting elements. An optical characteristic of the lighting elements, e.g., brightness, intensity, timing, and other characteristics, can be controlled remotely via a projected control image over a space or volume, where the space and projected image are divided into pixel-like sections. This remote control allows the audience to participate in an event through including the audience in the event's lighting structure, such as manipulating the lighting elements according to sounds. Further, since the operator controls the lighting elements on each reactive module, the audience as a whole can be used to display pictures or video, moving patterns, or any other image. Thus, by controlling the lighting elements by location, and not by their identity, an image or video frame can be "displayed".

Alternatively, the disclosed apparatus and methods can wirelessly manipulate optical characteristics of lighting elements such as stage lighting. In such circumstances, stage or area lighting can be remotely controlled using a projector, and lighting elements in different areas can be separately governed. Traditionally, individual cables are used to control stage lighting elements. With the disclosed apparatus and methods, however, stage lighting can be wireless controlled using a two-dimensional projected image. The sub-images within the projected image can control the stage lighting elements within the area over which the sub-images are projected. A receiving module can be placed on the stage lighting element to receive and interpret a control signal for controlling the stage lighting element. Thus, implementing the disclosed methods and apparatus, stage lighting or other area lighting can be wireless controlled based on the location of the lighting elements, instead of the lighting elements' identity.

Yet another application of the disclosed apparatus and methods is for use as a video screen. In such an embodiment, the video screen is comprised of several reactive modules which serve as pixels of the screen. Using a projector to project a two-dimensional control image onto the video screen, an image can be displayed on the video screen by controlling the optical characteristics of the lighting elements of the reactive modules within the screen. A benefit of this system is that a dead pixel in the screen, i.e. a reactive module, can simply be replaced with another reactive module, without modifying the rest of the screen.

Although a variety of embodiments are shown and described above, it should be understood that other various modifications can also be made. For example, an LED array can take any shape, and is not necessarily rectangular. Also, the type of wireless communication (optical transmission) to reactive devices can vary. In other embodiments, the pixel information can be encoded in any suitable wireless communication encoding scheme, depending on the lighting apparatus design. This disclosure also contemplates implementing a projector with reflective optical elements in conjunction with or alternatively to refractive optical elements (lenses). Any optical waveguide or other method of wirelessly projecting a control image is contemplated within the scope of the present disclosure.

One skilled in the art will appreciate that embodiments and/or portions of embodiments of the present disclosure can be implemented in/with computer-readable storage media (e.g., hardware, software, firmware, or any combinations of such), and can be distributed and/or practiced over one or more networks. Steps or operations (or portions of such) as described herein, including processing functions to derive, learn, or calculate formula and/or mathematical models utilized and/or produced by the embodiments of the present disclosure, can be processed by one or more suitable processors, e.g., central processing units ("CPUs) implementing suitable code/instructions in any suitable language (machine dependent on machine independent).

Accordingly, the embodiments described herein, and as claimed in the attached claims, are to be considered in all respects as illustrative of the present disclosure and not restrictive.

What is claimed is:

1. A method of wireless reception of a two-dimensional optical control instruction to control a plurality of lighting elements, the method comprising:

with a plurality of separate light sources configured as a two-dimensional array, forming a two-dimensional optical control signal including a two-dimensional array of separate pixels;

with a plurality of moveable reactive modules configured in a two-dimensional distribution, wherein each reactive module includes an optical receiver and a lighting element, receiving the two-dimensional optical control signal from a projector, wherein each reactive module receives a respective separate pixel of the two-dimensional array of separate pixels;

converting the control signal into a respective digital signal for each reactive module;

decoding the digital signal into a respective instruction for controlling the lighting element of each reactive module;

transmitting the instruction to the lighting element of the respective reactive module; and controlling the lighting element according to its respective instruction.

2. The method of claim 1, wherein the one or more reactive modules further include a power source to provide power to one or more of the optical receiver and a lighting element.

3. The method of claim 2, wherein the power source includes a battery.

4. The method of claim 1, wherein the optical receiver is configured to receive infrared signals.

5. The method of claim 1, wherein the lighting element includes a light emitting diode.

6. The method of claim 1, wherein the plurality of separate light sources includes light emitting diodes.

7. The method of claim 1, wherein the one or more reactive modules are affixed to an article of clothing or accessory.

8. A reactive module system to receive, interpret, and implement a two-dimensional control signal, the reactive module system comprising:

a plurality of separate light sources configured in a two-dimensional array and to form a two-dimensional optical control signal including a two-dimensional array of separate pixels;

a plurality of moveable optical receivers configured to receive a portion of the two-dimensional optical control signal and produce a detected control signal, wherein each optical receiver is configured to receive a separate pixel of the two-dimensional optical control signal;

a plurality of lighting elements, each connected to a respective one of the optical receivers; and a plurality of computing units, each connected to a respective optical receiver and lighting element, wherein the computing unit is configured to convert the detected control signal into a respective instruction for control of the lighting element.

9. The reactive module system of claim 8 further comprising a power source to provide power to one or more of the wireless signal detector, lighting element, and the computing unit.

10. The reactive module system of claim 9, wherein the power source includes a battery.

11. The reactive module system of claim 8, wherein the optical receivers are configured to receive infrared signals.

12. The reactive module system of claim 8, wherein the one or more lighting elements include light emitting diodes.

13. The reactive module system of claim 8, wherein the plurality of separate light sources include light emitting diodes.

14. The reactive module system of claim 8, wherein the one or more optical receivers and the one or more lighting elements are affixed to an article of clothing or accessory.

* * * * *